Nov. 15, 1927.
J. A. OLDSON
1,649,541
SIX-THROW, FOUR-BEARING, BALANCED CRANKSHAFT
Filed May 1, 1925
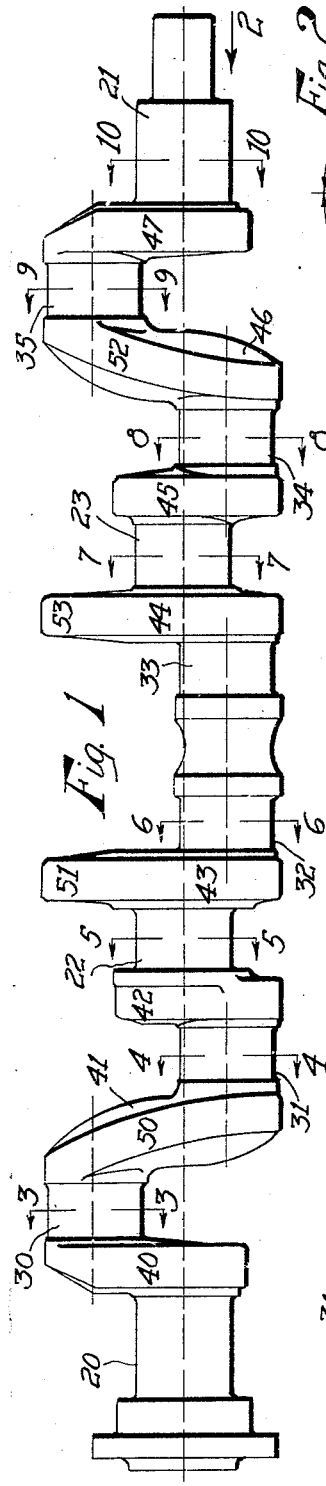
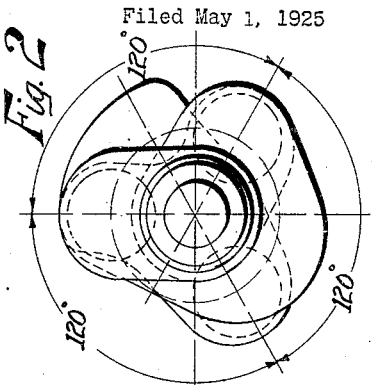
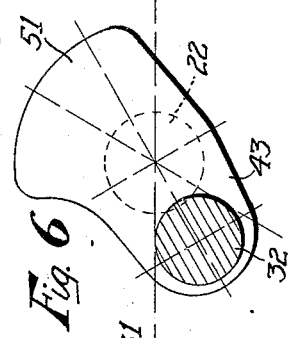
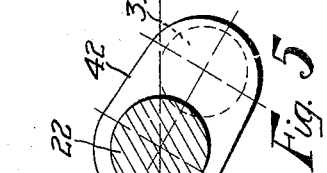
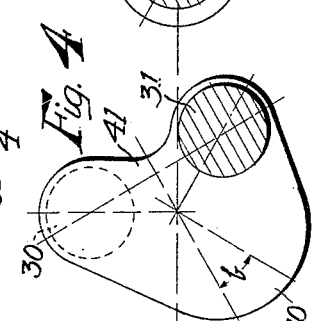
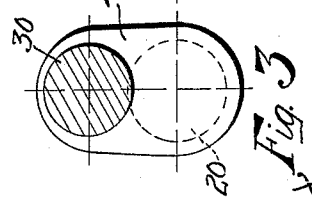
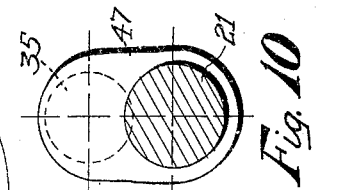
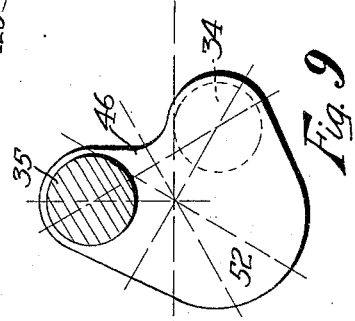
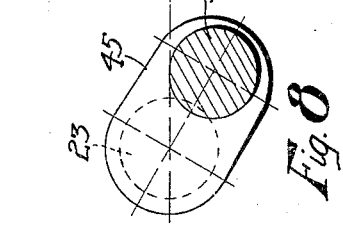
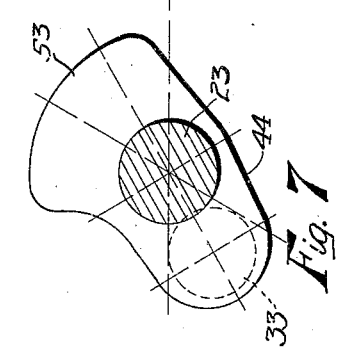
Inventor
John A. Oldson
By Attorneys
Southack Fay & Hawley Patented Nov. 15, 1927.

1,649,541

UNITED STATES PATENT OFFICE.

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS.

SIX-THROW, FOUR-BEARING, BALANCED CRANK SHAFT.

Application filed May 1, 1925. Serial No. 27,283.

This invention relates to a crankshaft, as used in internal combustion engines and particularly as used in automobile and aeroplane engines. In such machines, the engine is mounted upon a relatively light frame and there is no heavy base or foundation to absorb vibrations. Under such conditions, it is very important that the engine should be carefully and accurately balanced within itself in order to insure smooth running and to prevent disagreeable and destructive vibration.

It is recognized that the ordinary six-throw crank-shaft is not balanced against the dynamic forces generated at high speeds, no matter how perfect its static balance may be, and it is the general object of my present invention to provide a crankshaft of the six-throw four-bearing type in which counterweights are so disposed that the shaft will be in perfect static balance and that no noticeable vibration will be developed at any reasonable or probable speed of rotation.

My invention further relates to arrangements and combinations of parts which will be hereinafter described and more particularly pointed out in the appended claim.

A preferred form of the invention is shown in the drawings, in which

Fig. 1 is a side elevation of my improved crankshaft;

Fig. 2 is an end view thereof, and

Figs. 3 to 10 inclusive, are sectional elevations taken along the correspondingly numbered section lines in Fig. 1.

Referring to the drawings, I have shown a six-throw four-bearing crankshaft of a type adapted for use in automobile or other internal combustion engines. My improved shaft is provided with end shaft bearings 20 and 21 and with intermediate shaft bearings 22 and 23. The shaft is also provided with six crankpins associated in pairs between adjacent shaft bearings and numbered 30 to 35 inclusive.

The end shaft bearing 20 is connected to the crankpin 30 by a straight single cheek 40 (Fig. 3), the crankpin 30 is connected to the crankpin 31 by a curved connecting cheek 41 (Fig. 4), the crankpin 31 is connected to the intermediate shaft bearing 22 by a single straight cheek 42 (Fig. 5), and the main bearing 22 is connected to the crankpin 32 by a single straight cheek 43. The right hand half of the crankshaft, as viewed in Fig. 1 is provided with straight single cheeks 44 and 45, a curved connecting cheek 46 and a straight single cheek 47, the arrangement and function of which is identical with that of the cheeks 40 to 43 previously described.

Considering now the left hand half of the crankshaft, it has been found as previously stated that this type of shaft is not balanced against dynamic forces, no matter how carefully it may be balanced against static forces. I have found by experiment and computation that a counterweight 50 of a certain determined mass applied at a particular angle to the curved connecting cheek 41 will offset certain unbalanced dynamic forces generated by rotation of the shaft.

The mass of the counterweight and the exact angle at which it is placed must be determined for each type or design of crankshaft and may be proportioned to take care of certain of the unbalanced dynamic forces generated by the rotating shaft itself, or may also include a certain proportion of the unbalanced forces due to the connecting rod ends, which oscillate in its rotation.

While the mass of the counterweight and its angle of application varies somewhat with conditions, as above stated, I have found that the angle $b$ (Fig. 4) between the center line of the counterweight and the perpendicular to the center line of the curved connecting cheek 41 is never substantially greater than 30° and never substantially less than 10°. In an average case, the angle $b$ will be approximately fifteen degrees.

While the application of the counterweight 50 takes care of certain of the unbalanced dynamic forces generated by rotation of the shaft, it is obvious that the addition of this counterweight alone would destroy the static balance of the crankshaft. Accordingly, I apply a counterweight 51 to the single cheek 43 to maintain the static balance, the counterweights 50 and 51 being of equal magnitude and being disposed at 180° apart.

Corresponding counterweights 52 and 53 are provided for the right hand half of the shaft and are mounted upon the curved connecting cheek 46 and the straight single cheek 44 respectively.

The counterweights 50, 51, 52, and 53 may be formed and applied to the crankshaft in any usual manner, but I prefer to form the counterweights integrally with the crankshaft during the forging operation thereof, preferably making use of the method of forging fully disclosed in the prior patent to Larcher No. 1,434,215, issued October 31, 1922.

A crankshaft constructed as above described has been found by prolonged and severe tests to be extremely well adapted for high speed rotation in automobile engines and in other similar machines, and has been found capable of rotation without noticeable vibration at any reasonable or practical speed.

Having thus described my invention and the advantages thereof, I do not wish to be limited to the details herein disclosed, otherwise than as set forth in the claim, but what I claim is:—

A six-throw four-bearing crankshaft having two straight single cheeks and one curved connecting cheek between each end shaft bearing and its adjacent intermediate shaft bearing, and having two straight single cheeks between the intermediate shaft bearings, and having counterweights applied to the curved connecting cheeks and to the single cheeks between the intermediate shaft bearings, the counterweights on the curved connecting cheeks substantially counterbalancing certain of the unbalanced dynamic forces generated by high speed rotation of the crankshaft, and the counterweights between the intermediate shaft bearings maintaining the static balance of the shaft, said counterweights being so positioned that the center line of the counterweight on each curved connecting cheek is offset from a line perpendicular to the center line of said curved cheek at an angle of approximately 15° and that the counterweight on each single intermediate cheek is offset from the projected center line of its associated single cheek at an angle of approximately 15° in the same angular direction.

In testimony whereof I have hereunto affixed my signature.

JOHN A. OLDSON.